(12) United States Patent
Zhao et al.

(10) Patent No.: US 8,872,061 B2
(45) Date of Patent: Oct. 28, 2014

(54) APPARATUS FOR DISCONNECTING SOLDER JOINTS BETWEEN TWO WELDED SURFACES

(75) Inventors: Qin Ping Zhao, DongGuan (CN); Shen Kuang Sidney Chou, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 302 days.

(21) Appl. No.: 13/570,324

(22) Filed: Aug. 9, 2012

(65) Prior Publication Data
US 2014/0008336 A1    Jan. 9, 2014

(30) Foreign Application Priority Data
Jul. 9, 2012 (CN) .......................... 2012 1 0236404

(51) Int. Cl.
*B23K 26/14* (2014.01)
*B23K 1/018* (2006.01)

(52) U.S. Cl.
USPC ..................................... 219/121.65; 228/20.1

(58) Field of Classification Search
CPC ........ B23K 1/018; B23K 26/14; B23K 26/16; B23K 26/36; B23K 26/38; B23K 26/40; B08B 5/04; B08B 7/0035
USPC ............. 219/121.6, 121.65, 121.66; 228/191, 228/264, 19–21; 29/426.1, 426.2
See application file for complete search history.

(56) References Cited

U.S. PATENT DOCUMENTS 8,330,076 B2 * 12/2012 Azdasht .................... 219/121.75
2013/0256277 A1 * 10/2013 Li et al. ............................ 219/74

FOREIGN PATENT DOCUMENTS

JP           01133672 A  *  5/1989

* cited by examiner

*Primary Examiner* — Samuel M Heinrich
(74) *Attorney, Agent, or Firm* — Nixon & Vanderhye PC

(57) ABSTRACT

An apparatus for disconnecting solder joints between two welded surfaces includes a laser device for emitting laser beams to a solder joint, and a solder material removal device. And the solder material removal device includes a nozzle device having a first passage, a holder holding the nozzle device and having a second passage communicated with the first passage, and at least two pumping devices connected to the holder to pump the melted solder material out from the nozzle device and the holder. The laser device and the solder material removal device are separated, a glass cover with a hole formed thereon is covered on the top of the holder, and the laser device is located above the glass cover and separated from the holder. The present invention can shorten maintenance time and maintenance workload and improve work efficiency, furthermore reduce and stabilize the laser energy.

11 Claims, 9 Drawing Sheets

US 8,872,061 B2

APPARATUS FOR DISCONNECTING SOLDER JOINTS BETWEEN TWO WELDED SURFACES

This application claims priority to Chinese Application No. 201210236404.1 filed 9 Jul. 2012, the entire contents of which is hereby incorporated by reference.

FIELD OF THE INVENTION

The present invention relates to an apparatus for disconnecting solder joints between two welded surfaces in a disk drive unit and, more particularly, to an apparatus for disconnecting solder joints between a head gimbal assembly (HGA) and a flexible printed circuit (FPC) in a defective head stack assembly (HSA).

BACKGROUND OF THE INVENTION

Hard disk drives are information storage devices that use thin film magnetic media to store data. Referring to FIG. 1a, a typical hard disk drive 1 in prior art comprises a head stack assembly (HSA) 10 with slider 11 (shown in FIG. 1b) thereon, a magnetic disk 12 mounted on a spindle motor 13 which causes the magnetic disk 12 to spin, and a motor base 14 to enclose the above-mentioned components.

The slider 11 flies over the surface of the magnetic disk 12 at a high velocity to read data from or write data to concentric data tracks on the magnetic disk 12, which is positioned radially by a voice coil 15 embedded (e.g. by epoxy potting or overmolding) in a fantail spacer 16 of the HSA 10. Generally, a voice coil motor (VCM) 16 is used to drive the voice coil 15.

Referring to FIG. 1b, a traditional HSA 10 includes an actuator coil assembly (ACA) 101, a fantail spacer 16 interposed in the ACA 101 via the voice coil 15, at least an HGA 102 connected with the ACA 101, and a controlling circuit 140 for controlling the HGA 102. The ACA 101 has at least one top surface 131 for mounting the HGA 102, and a side surface 132 for mounting the control circuit 140.

As shown in FIG. 1b, the controlling circuit 140 is a flexible printed circuit assembly (FPCA) that includes a printed circuit board assembly (PCBA) 141 for connecting with a preamplifier (not shown) and a flexible printed circuit (FPC) 142 connecting with the PCBA 141. And the FPC 142 electrically connects to the HGA 102, and mounts on the side surface 132 of the ACA 101.

The HGA 102 includes a suspension 190 and a slider 11 supported by the suspension 190, and the suspension 190 includes a flexure 126 having a head 126a and a tail 126b, and the flexure 126 runs from the slider 11 to the tail 126b. The tail 126 is bent for connecting with the FPC 142. The tail 126 has several bonding pads 128 formed thereon. Concretely, the FPC 142 includes several bonding pads 143 formed thereon. The HGA 102 is connected with the FPC 142 by connected the bonding pads 128 with the bonding pads 143 via several solder joints (not shown). Concretely, a solder joint is formed between the bonding pad 128 of the HGA 102 and the bonding pad 143 of the FPC 142 by using a soldering device.

Additionally, the assembly of the disk drive unit 1 further includes solder joints between the slider 11 and the suspension 190, the FPC 142 and the fantail spacer 16, etc.

During the process of forming the solder joints, defects would be generated due to fine positioning difference between the soldering device and the welded surfaces, or laser energy for melting the solder joint is unstable, and so on. For example, the main defects include bad solder joints, short circuit occurred between adjacent solder joints, and burned surfaces on the FPC 142 or the HGA 102. Thus defective HSAs with defects existing in the HGA 102 and the solder joints are often detected in a subsequent Quasi Static Test process. Therefore, it is necessary to disconnect the defective solder joints between the HGA 102 and the FPC 142 to remove the defective HGA 102 and reuse the other components.

FIG. 2 shows a conventional apparatus for repairing defective solder joints. As shown, the apparatus 200 functions as a repairing device and a soldering device. Concretely, the apparatus 200 includes a laser device 210 including a laser generator 211 and a lens 212 for melting solder ball or solder joint, a device 220 for supplying or collection solder material, a handling device 230 for carrying the process, and a pressure connection 240 for connecting a gas supplying device (not shown) or a pumping device (not shown). When used for a repairing device, the solder joints 251 will be melted by laser beams emitted by the laser device 210 firstly, and then pumped by the pumping device connected with the handled device 230, and finally be connected into the device 220.

As the lens 212 is connected with the top of the handling device 230 directly, that is the top of the handling device 230 is closed by the lens 212, on one hand, it's hard to adjust optical axis of the laser device 210 and the handling device 230; on the other hand, a mass of remains of the solder material will be gathered on the lens 212, which may reduce the stability of the laser energy and reduce its efficiency. Furthermore, due to only one pressure connection 240 is connected with the handling device 230, thus the suction force of the pumping device is not sufficient, which may cause remains of the solder material to block on the outlet of the handling device 230. Thus it's necessary to clean the handling device 230 frequently for ensuring its normal working. However, due to the structure of the handling device 230 is unitary, that is, the outlet and the handling device 230 are integrative, thus it's quite inconvenient to clean or change the handling device 230, which may spend a lot of time and workload.

Therefore, there is a need for an improved apparatus for disconnecting solder joints between two welded surfaces in a disk drive unit to overcome the drawbacks mentioned above.

SUMMARY OF THE INVENTION

One aspect of the present invention is to provide an apparatus for disconnecting solder joints between two welded surfaces in a disk drive unit, which can shorten maintenance time and maintenance workload and improve work efficiency, furthermore stabilize the laser energy and reduce its losing.

To achieve above objective, an apparatus for disconnecting solder joints between two welded surfaces in a disk drive unit includes a laser device for emitting laser beams to a solder joint, thereby melting the solder joint into melted solder material, and a solder material removal device. And the solder material removal device includes a nozzle device having a first passage, a holder holding the nozzle device and having a second passage communicated with the first passage, and at least two pumping devices connected to the holder to pump the melted solder material out from the nozzle device and the holder. The laser device and the solder material removal device are separated, a glass cover with a hole formed thereon is covered on the top of the holder, and the laser device is located above the glass cover and separated from the holder.

As a preferred embodiment, two intakes communicated with the second passage are formed on the holder, and the two pumping devices are connected with the two intakes respectively.

Preferably, each of the pumping devices includes a flexible pipe connected with the intake, a collection vessel connected with the flexible pipe for collecting the melted solder material, and an air pumping unit connecting with the collection vessel.

Preferably, a pressure connection is formed between the collection vessel and the air pumping unit.

As another preferred embodiment, the nozzle device is fixed with the holder by a connecting piece.

Preferably, the connecting piece is a screw or a rivet.

As yet a preferred embodiment, the nozzle device is connected with the holder elastically.

Preferably, the nozzle device is connected with the holder by a pressure spring.

Preferably, the laser device includes a laser generator for emitting the laser beams and a lens combination faced to the glass cover for focusing the laser beam to the solder joint.

Preferably, the nozzle device includes a tapered outlet whose diameter is adjustable.

More preferably, the tapered outlet has an arc-shaped periphery.

In comparison with the prior art, the present invention provides a special apparatus for disconnecting solder joints between two welded surfaces in a disk drive unit. The apparatus includes a solder material removal device having a nozzle device having a first passage, a holder holding the nozzle device and having a second passage communicated with the first passage, and at least two pumping devices connected to the holder to pump the melted solder material out from the nozzle device and the holder. And the laser device and the solder material removal device are separated, a glass cover with a hole formed thereon is covered on the top of the holder, and the laser device is located above the glass cover and separated from the holder.

Based on the above design, on one hand, due to the hole is formed on the glass cover which acts as a way of airflow, thus the remains of the melted solder material which are absorbed in the first passage can not be gathered on the surface of the glass cover under the power of the airflow. As a result, the losing of the laser beams passing the glass cover is little even undergoing a long working time. On the other hand, as at least two pumping devices are connected with the holder, thus the suction force is enlarged, therefore little remain of the melted solder material is left on the side walls of the holder. Furthermore, as the laser device and the solder material removal device are separated, thus the optical axis of the laser device can be adjusted exactly and easily, which can stabilize the laser beams and improve the using efficiency of the laser beams.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 1b is a perspective exploded view of a HSA of the hard disk drive shown in FIG. 1a;

DETAILED DESCRIPTION OF ILLUSTRATED EMBODIMENTS

Figure 1A:
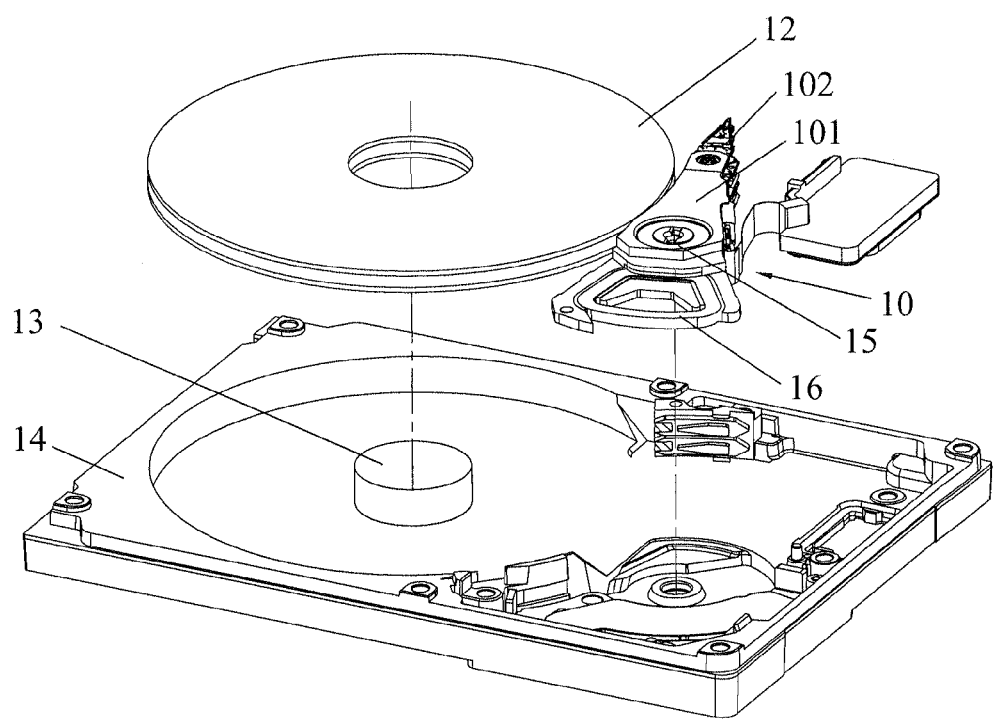
FIG. 1a is a perspective exploded view of a conventional hard disk drive.
Figure 1B:
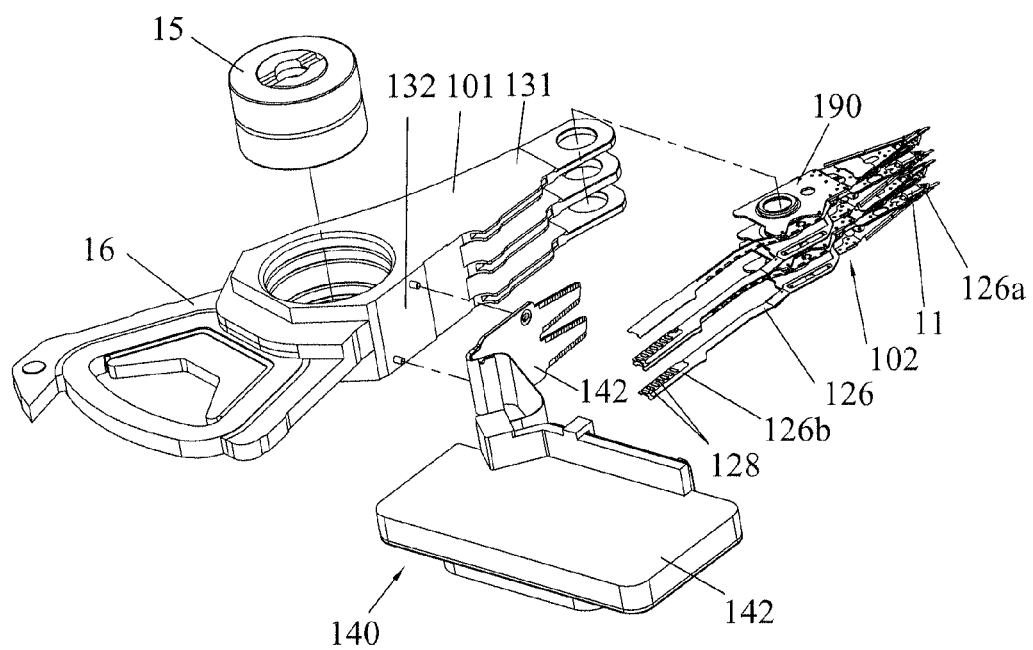
Figure 2:
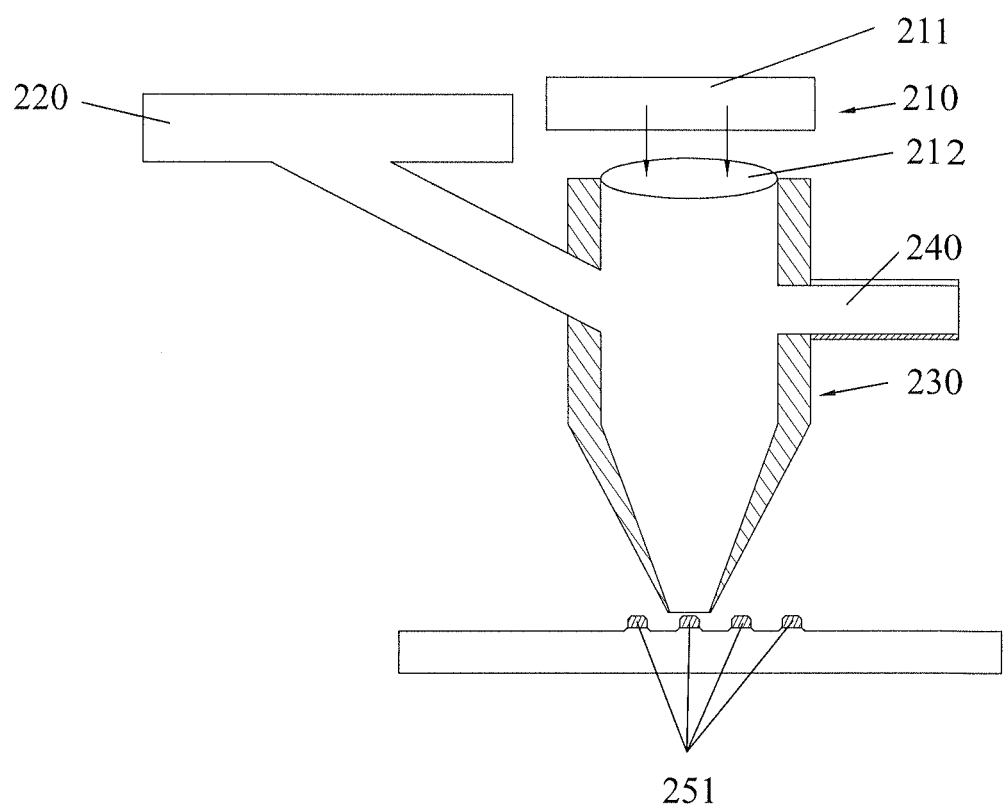
FIG. 2 shows a conventional apparatus for disconnecting solder joints between two welded surfaces in the hard disk drive.

Various preferred embodiments of the invention will now be described with reference to the figures, wherein like reference numerals designate similar parts throughout the various views. As indicated above, the invention is directed to an apparatus for disconnecting solder joints between two welded surfaces in a disk drive unit, which can shorten maintenance time and maintenance workload and improve work efficiency, furthermore reduce and stabilize the laser energy.

Figure 3A:
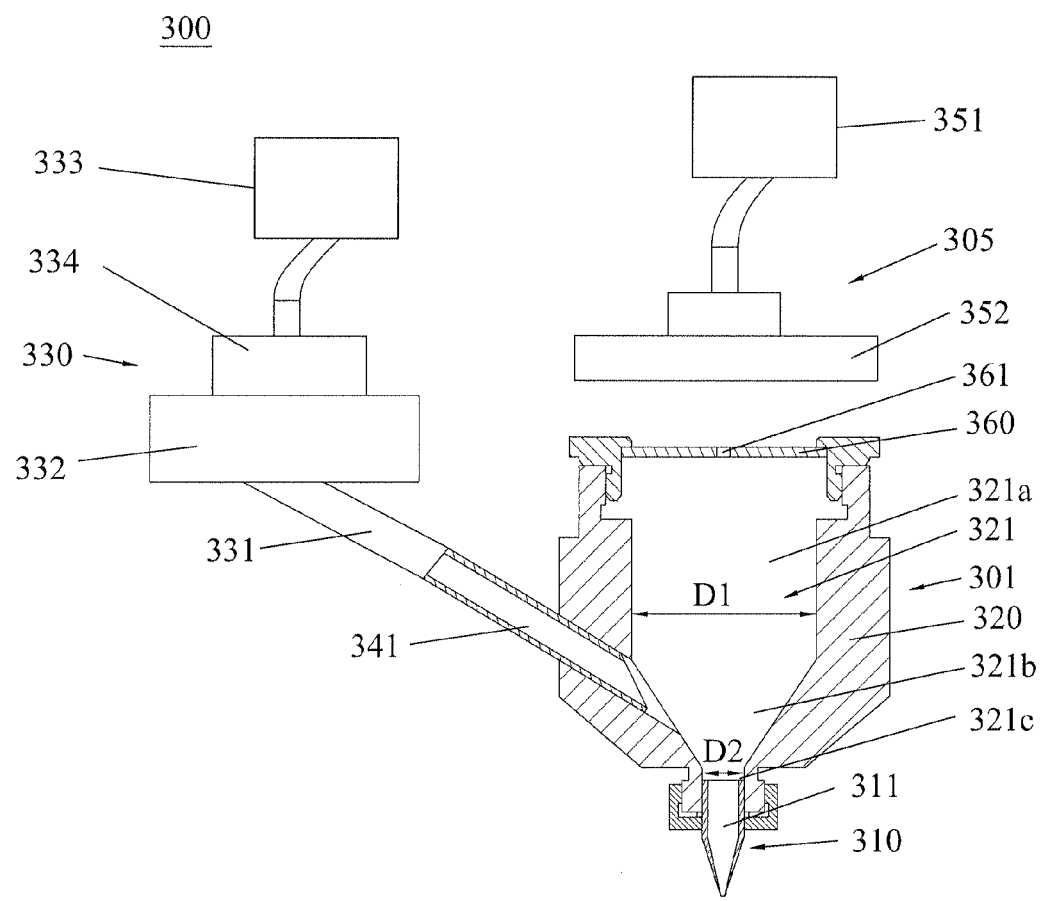
FIG. 3a is a cross section view of an apparatus for disconnecting solder joints between two welded surfaces in a hard disk drive according to one embodiment of the present invention.
Figure 3B:
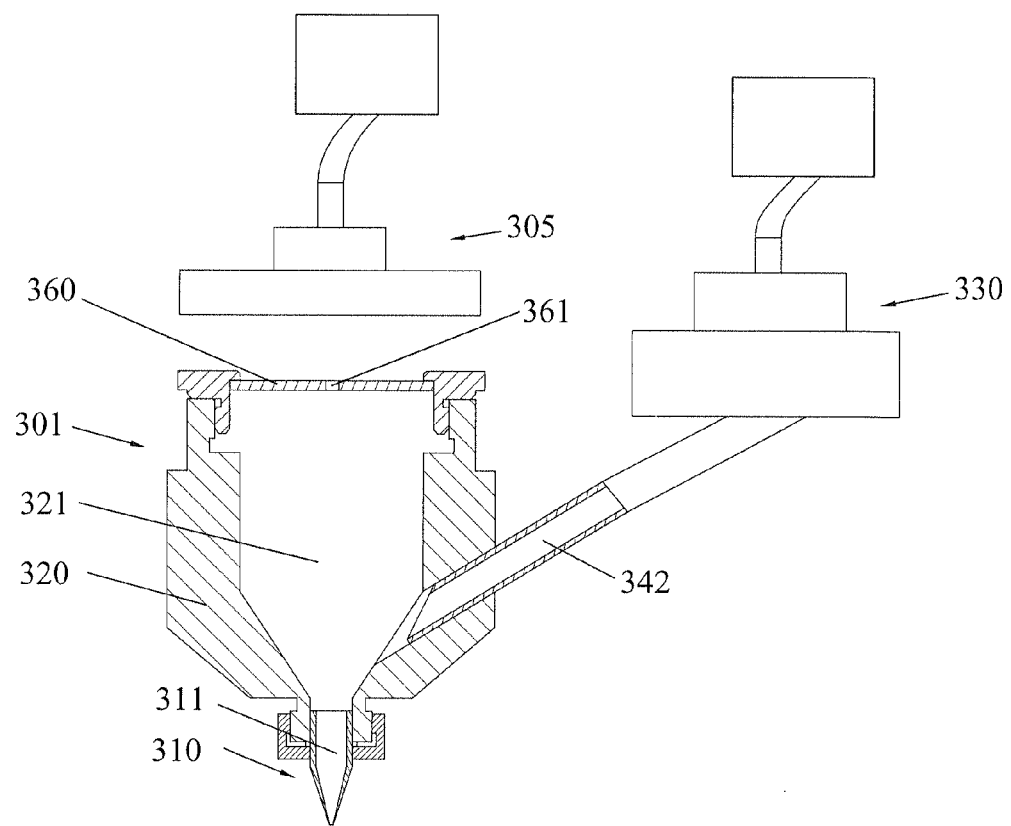
FIG. 3b is another cross section view of an apparatus for disconnecting solder joints between two welded surfaces in a hard disk drive according to one embodiment of the present invention.
Figure 4:
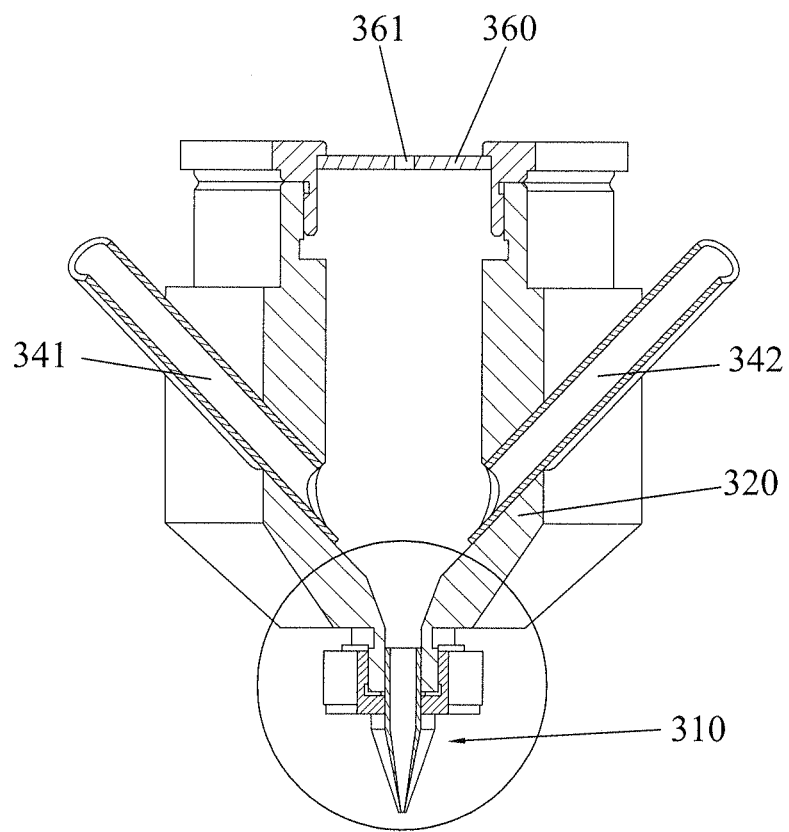
FIG. 4 is a partial cross section view of the apparatus.

FIGS. 3a-4 are cross section views of an apparatus for disconnecting solder joints between two welded surfaces in a hard disk drive according to one embodiment of the present invention. As shown, the apparatus 300 includes a solder material removal device 301 and a laser device 305. Concretely, the solder material removal device 301 includes a nozzle device 310 having a first passage 311, a holder 320 holding the nozzle device 310 and at least two pumping devices 330 connected to the holder 320.

Concretely, the holder 320 has a second passage 321 communicated with the first passage 311 of the nozzle device 310. The second passage 321 includes an upper portion 321a with a rectangular cross section which has a first diameter D1, a middle portion 321b with a conical tapered cross section and a lower portion 321c with a rectangular cross section which has a second diameter D2. At the lower portion 321c is the nozzle device 310 connected. A glass cover 360 with a hole 361 is formed on the top of the holder 320. Concretely, the hole 361 acts as a way of airflow, thus the remains of the melted solder material which are to be absorbed in the first passage 311 can not be gathered on the surface of the glass cover 360 under the power of the airflow. As a result, the losing of the laser beams passing the glass cover 360 is little even undergoing a long working time. And the cleaning frequency for the glass cover 360 is reduced.

Figure 5A:
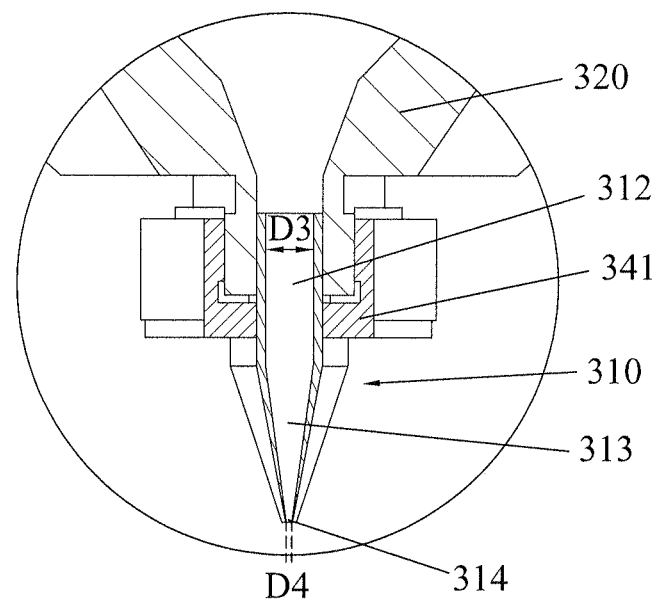
FIG. 5a is a partial enlarged view of the nozzle device and the holder according to an embodiment of the present invention.
Figure 5B:
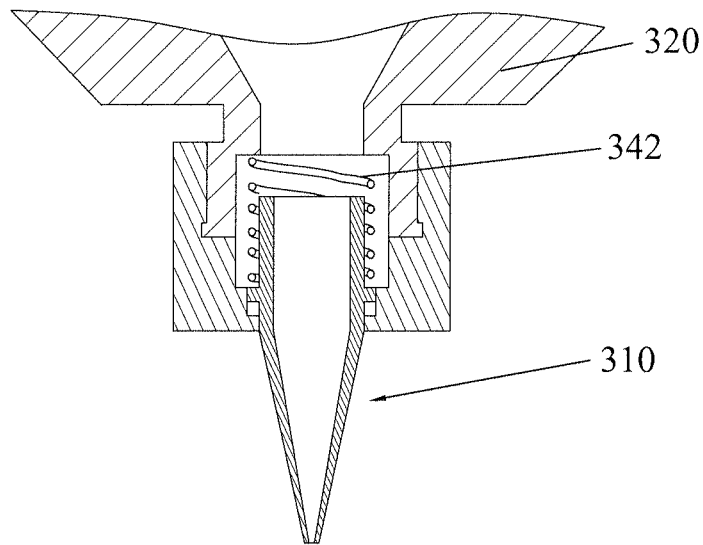
FIG. 5b is a partial enlarged view of the nozzle device and the holder according to another embodiment of the present invention.
Figure 6:
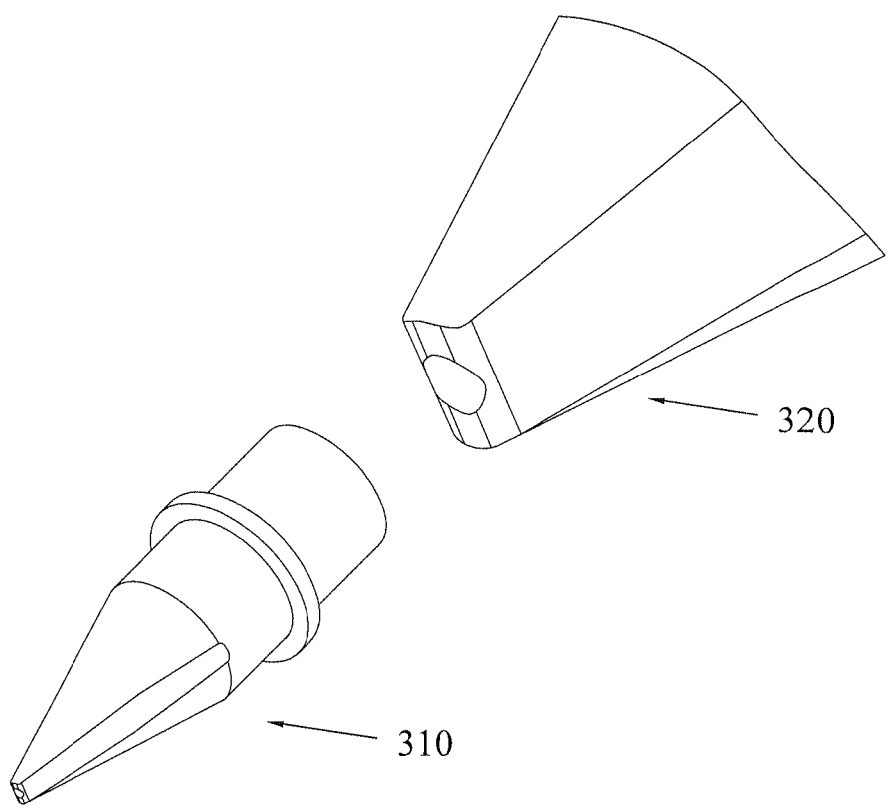
FIG. 6 is a perspective view of the nozzle device and the partial holder.

As shown in FIG. 5a and FIG. 6, the nozzle device 310 is firmly connected with the holder 320 by a connecting piece, such as a screw 341 or a rivet. Based on this design, the nozzle device 310 can be disassembled and changed easily. Alternatively, as shown in FIG. 5b, the nozzle device 310 is connected with the holder 320 elastically, such as by a pressure spring 342. As the nozzle device 310 is connected elastically, thus the welded surfaces can be avoided from being damaged by the rigid nozzle device 310.

Figure 7:
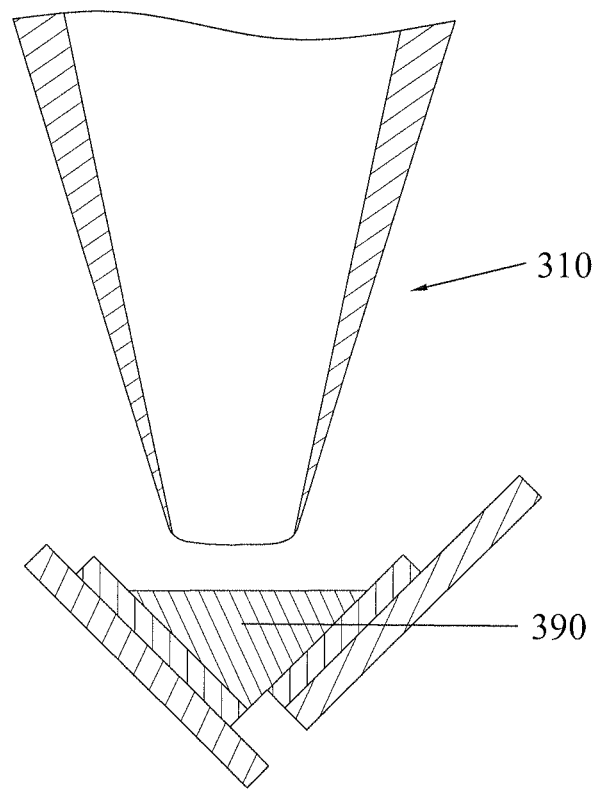
FIG. 7 is a partial cross section view of the apparatus above the defective solder joint.

Referring to FIGS. 5a-7, the nozzle device 310 includes an upper portion 312 with a rectangular cross section which has a third diameter D3, and a lower portion 313 with a conical tapered cross section which has a tapered outlet 314 having a fourth diameter D4. Concretely, the fourth diameter D4 is adjustable as the size of the solder joints between the two welded surfaces. Accordingly, the diameters D1, D2, D3 are adjustable. Concretely, the tapered outlet 314 has an arc-shaped periphery (as shown in FIG. 7), which can prevent the bonding pads (welded surfaces) from scratching when the nozzle device 310 works.

Referring to FIGS. 3a-3b again, as an embodiment, two intakes 341, 342 are connected to side wall of the holder 320 and communicated with the second passage 321, and two pumping devices 330 are connected with the two intakes 341, 342 respectively. Concretely, the pumping device 330 includes a flexible pipe 331 connected with the intake 341, a collection vessel 332 connected with the flexible pipe 331 for collecting the melted solder material, and an air pumping unit 333 connecting with the collection vessel 332 for applying negative pressure to the first passage 311 and the second passage 321. Preferably, a pressure connection 334 is formed between the collection vessel 332 and the air pumping unit 333.

As shown, the laser device 305 includes a laser generator 351 for emitting the laser beams and a lens combination 352 faced to the holder 320 for focusing the laser beams to the solder joint. Concretely, the laser device 305 is independent structure without contacting with the holder 320. Specifically, the lens combination 352 is faced to the glass cover 360.

Now please combine with FIGS. 3a-7, the fundamental principle of the present invention will be described.

The apparatus 300 is used for disconnecting defective solder joints between two welding surfaces. Firstly, exactly placing the nozzle device 310 installed in the holder 320 above to the solder joint 390, and then adjusting the optical axis of the laser device 305 along the axis of the nozzle device 310. Subsequently, laser beams generated by the laser generator 351 is transmitted to the lens combination 352 and then focused to the glass cover 360 on the holder 310, finally shot on the surface of the solder joints 390 and melted it. As the laser device 305 is an independent structure, thus the optical axis of the laser device 305 can be adjusted exactly and easily, which can stabilize the laser beams and improve the using efficiency of the laser beams.

Subsequently, the melted soldering material is absorbed by suction force produced by the pumping devices 330 and transferred into the collection vessel 332 through the second passage 321, the first passage 311, the intake 341 and the flexible pipe 331 respectively. As two pumping devices 330 connected with the holder 320 works at the same time, thus the suction force is enlarged, and in turn, little remain of the melted solder material is left on the side walls of the holder 320. On the other hand, due to the hole 361 is formed on the glass cover 360 which acts as a way of airflow, thus the remains of the melted solder material which are absorbed in the first passage 311 can not be gathered on the surface of the glass cover 360 under the power of the airflow. As a result, the losing of the laser beams passing the glass cover 360 is little even undergoing a long working time. Furthermore the cleaning frequency for the glass cover 360 is reduced.

In addition, because the nozzle device 310 and the holder 320 are independent, and the nozzle device 310 can be disassembled from the holder 320, thus it's convenient to clean the nozzle device 310, which can save maintenance time and work load. Moreover, different nozzle devices 310 with different sizes are applicable to the holder 320, to remove different solder joints formed between different surfaces.

The apparatus 300 of the present invention can be used to repair any defective solder connections needed to disconnect in the disk drive unit, for example, an electrical solder connection between a slider and a suspension of a HGA, an electrical solder connection between a grounding pin or a voice lead provided on a fantail spacer and an FPC, an electrical solder connection between a suspension flexure of a HGA and a FPC, or an electrical solder connection between an PCBA and an FPC, and the like.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An apparatus for disconnecting solder joints between welded surfaces, comprising:
    a laser device for emitting laser beams to a solder joint, thereby melting the solder joint into melted solder material; and
    a solder material removal device comprising a nozzle device having a first passage, a holder holding the nozzle device and having a second passage communicated with the first passage, and at least two pumping devices connected to the holder to pump the melted solder material out from the nozzle device and the holder;
    wherein the laser device and the solder material removal device are separated, a glass cover with a hole formed thereon is covered on the top of the holder, and the laser device is located above the glass cover and separated from the holder.

2. The apparatus according to claim 1, wherein two intakes communicated with the second passage are formed on the holder, and the two pumping devices are connected with the two intakes respectively.

3. The apparatus according to claim 2, wherein each of the pumping devices comprises a flexible pipe connected with the intake, a collection vessel connected with the flexible pipe for collecting the melted solder material, and an air pumping unit connecting with the collection vessel.

4. The apparatus according to claim 3, wherein a pressure connection is formed between the collection vessel and the air pumping unit.

5. The apparatus according to claim 1, wherein the nozzle device is fixed with the holder by a connecting piece.

6. The apparatus according to claim 5, wherein the connecting piece is a screw or a rivet.

7. The apparatus according to claim 1, wherein the nozzle device is connected with the holder elastically.

8. The apparatus according to claim 7, wherein the nozzle device is connected with the holder by a pressure spring.

9. The apparatus according to claim 1, wherein the laser device comprises a laser generator for emitting the laser beams and a lens combination faced to the glass cover for focusing the laser beam to the solder joint.

10. The apparatus according to claim 1, wherein the nozzle device comprises a tapered outlet whose diameter is adjustable.

11. The apparatus according to claim 10, wherein the tapered outlet has an arc-shaped periphery.

* * * * *